Aug. 31, 1954 J. S. HARRIS 2,688,050

VALIDITY CHECKING CIRCUIT FOR CODED SIGNALS

Filed July 20, 1953 2 Sheets-Sheet 1

INVENTOR.
James S. Harris

BY Charles H. Brown

ATTORNEY

Aug. 31, 1954 J. S. HARRIS 2,688,050

VALIDITY CHECKING CIRCUIT FOR CODED SIGNALS

Filed July 20, 1953 2 Sheets-Sheet 2

INVENTOR.
James S. Harris

BY Charles H. Brown
ATTORNEY

Patented Aug. 31, 1954

2,688,050

UNITED STATES PATENT OFFICE 2,688,050

VALIDITY CHECKING CIRCUIT FOR CODED SIGNALS

James S. Harris, Old Greenwich, Conn., assignor to Radio Corporation of America, a corporation of Delaware Application July 20, 1953, Serial No. 368,973

7 Claims. (Cl. 178—23)

This invention relates to validity checking circuits for coded signals of the protected type wherein a character signal consists of a predetermined number of mark and space units and wherein a valid signal has a predetermined ratio of mark and space units.

While not limited thereto, this invention is particularly useful in the radio telegraph art wherein messages are transmitted across the ocean by means of a protected code, also called a constant-ratio code. According to a protected code presently in use, each character is represented by seven units, three of which are mark units and four of which are space units. In a frequency shift system, mark units may be represented by a signal of one frequency and space units may be represented by a signal of a slightly different frequency. In an amplitude modulation system, a mark unit may be represented by a pulse and a space unit may be represented by the absence of a pulse. A protected code is used to guard against errors caused by interference encountered on radio channels and is of the type described in Moore and Mathes Reissue Patent 23,028. At the receiving end of the system, each character signal is analyzed to determine whether it contains the proper ratio between mark and space units. If an improper ratio is found, the remotely located sending terminal is requested to retransmit the character signal which was received as a "non-valid" character with an improper ratio of mark and space units. The radio signal is normally transmitted in a manner such that each unit of a character is serially arranged in time. The receiving terminal includes means to store the units as they are received and to simultaneously present all units of a character to a validity checker which analyzes the character signal to determine whether it has the proper ratio of mark and space units.

It has been the practice to employ validity checkers which included electro-mechanical relays. Electro-mechanical relays require a considerable amount of maintenance since the contacts tend to become dirty and corroded, and relays have limitations as to the speed with which they can operate. It is therefore, a general object of this invention to provide an improved electronic means for checking the mark/space ratio of coded signals without limitations on the speed with which the checking can be made.

Validity checkers are known which include electronic voltage comparison circuits. In such circuits a differential amplifier is used to compare a reference voltage with a voltage which is proportional to the mark/space ratio of the incoming signal. The voltage comparison method involves complex circuitry and the maintenance of exact balance in a differential amplifier. It is therefore, another object of this invention to provide an improved electronic validity checking circuit which is characterized by higher degrees of simplicity and reliability than have heretofore been possible.

It is a further object of this invention to provide an improved electronic circuit which generates an output pulse when the circuit is receptive to a predetermined number of simultaneous input signals.

In one aspect, the invention comprises a system for checking the validity of a received signal, wherein each character is represented by seven units, each unit being either a mark signal or a space signal, to determine whether each character signal is made up of three mark units and four space units. The incoming signal is presented on seven lines each including a mark terminal and a space terminal. A mark signal is indicated on a line by a predetermined potential on the mark terminal of the line and a reference potential on the space terminal of the line. A space signal is indicated on a line by said predetermined potential on the space terminal of the line and said reference potential on the mark terminal of the line. All of the lines simultaneously present either a mark signal or a space signal. A mark bus is connected through seven identical resistors to the seven mark terminals, and a space bus is connected through seven identical resistors to the seven space terminals, all fourteen resistors being equal in value. The mark bus is also connected through a balancing resistor to a source of the above mentioned predetermined potential, and the space bus is also connected through a balancing resistor to a source of the above mentioned reference potential. The balancing resistors are also equal in value to the other fourteen resistors. An electronic circuit coupled to the mark and space buses provides an output gate solely when the potentials on the two buses are equal. The invention is also applicable to signals having more or less than seven units per character and to signals wherein a valid signal is represented by a ratio of marks to spaces other than 3/4.

These and other objects and aspects of the invention will be apparent to those skilled in the art from the following more detailed description of the invention taken in conjunction with the appended drawings, wherein.

Figure 1:
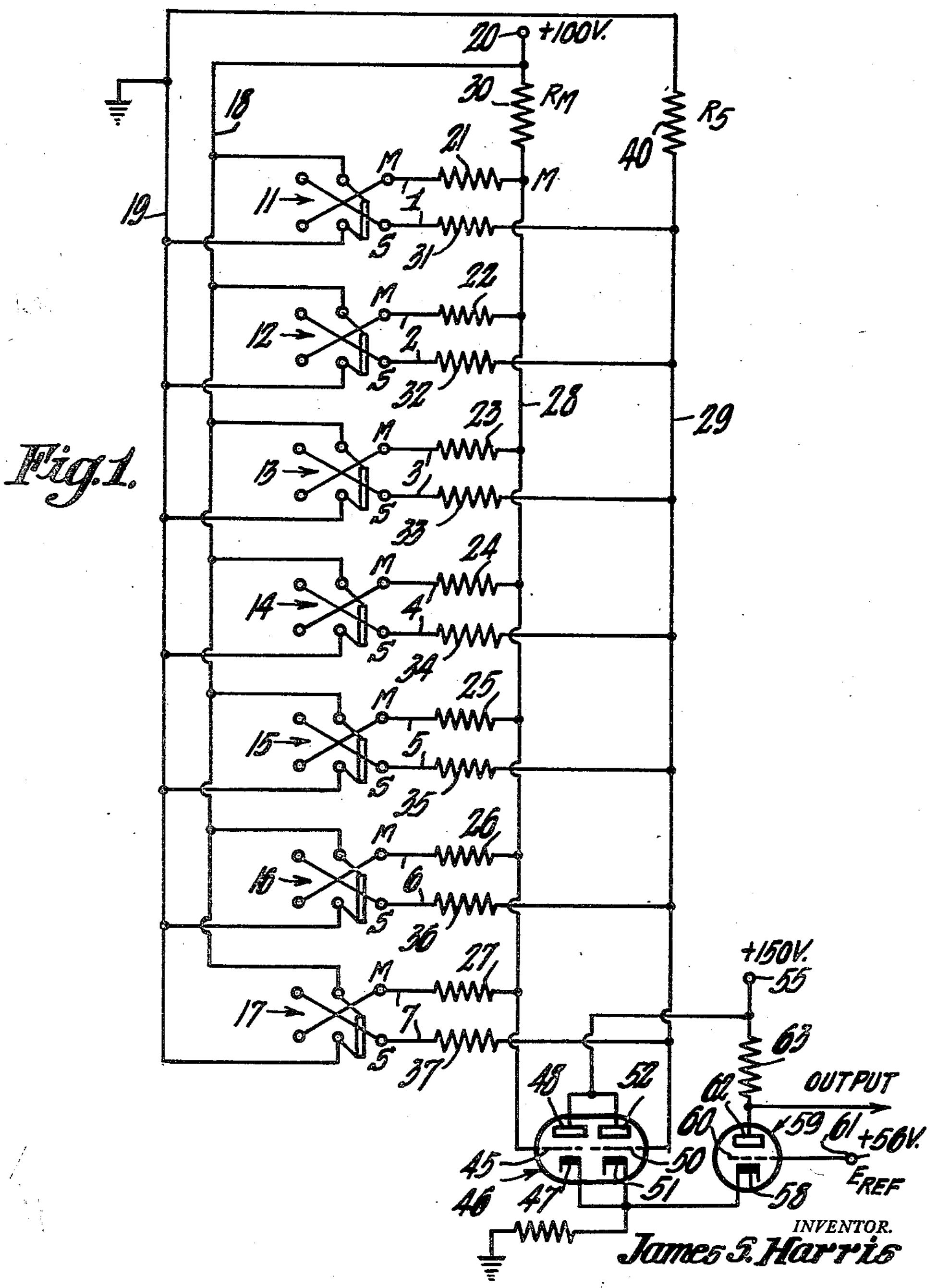
Figure 1 is a circuit diagram of a signal analyzing circuit constructed according to the teachings of this invention.

Figure 1 shows a signal analyzing or validity checking circuit for a simultaneous signal having seven simultaneous mark or space units, wherein a valid signal consists of three mark units and four space units. A signal to be checked is presented on seven line pairs indicated on the drawing by numerals 1 through 7. Each line includes a mark terminal M and a space terminal S. Seven double-pole double-throw switches 11 through 17 are provided, there being one switch for each of the seven line pairs. One pole of each of the switches is connected to a positive bus 18 which is, in turn, connected to the positive terminal 20 of a source of unidirectional potential (not shown). The negative terminal of the unidirectional potential source is connected to ground. The other pole of each of the switches is connected to a ground potential bus 19. Each of the seven switches 11 through 17 is arranged so that when the switch is in one position, namely, the mark position, positive potential is applied from positive bus 18 to the mark terminal M, the ground potential is applied from ground bus 19 to the space terminal S. If, for example, switches 11, 12 and 13 are thrown to the mark position, the corresponding mark terminals M will carry a positive potential and the space terminals S will carry ground potential; and if switches 14 through 17 are thrown to the space position, the corresponding space terminals S will carry the positive potential and the mark terminals M will carry ground potential. It will, of course, be understood that while switches 11 through 17 are shown in the drawing as manually operated switches, the switch contacts may be operated by electro-mechanical relays, or the switches may be in the form of well known vacuum tube switches.

Each of the mark terminals M of line pairs 1 through 7 is connected through one of resistors 21 through 27 to a mark bus 28. Each of the space terminals S of the line pairs 1 through 7 is connected through one of resistors 31 through 37 to a space bus 29. The mark bus 28 is also connected through a balancing resistor 30 to the positive terminal 20, and the space bus 29 is connected through a balancing reisster 40 to ground. Resistors 21 through 27 and 31 through 37 and 30 and 40 are of equal value.

The mark bus 28 is connected to the control grid 45 of a duo-triode vacuum tube 46 having a cathode 47 and a plate 48 forming an electrode structure including grid 45. The space bus 29 is connected to a control grid 50 which together with cathode 51 and plate 52 constitutes a second electrode structure within the envelope of duo-triode tube 46. Two electrode structures in separate evacuated envelopes could, of course, be used. The plates 48 and 52 are both connected to the positive terminal 55 of a source of unidirectional potential (not shown). The negative terminal of the source is connected to ground. Both of the cathodes 47 and 51 are connected through a common cathode resistor 56 to ground. The circuit including tube 46 is an "and/or" circuit wherein the amount of current flowing through cathode resistor 56 and consequently the voltage drop thereacross is in an amount dependent upon the potential applied to grid 45 and/or the potential applied to the grid 50.

The output of the and/or circuit is taken from cathodes 47, 51 and applied to the cathode of a gate generator vacuum tube 59. Tube 59 includes a grid 60 connected to the terminal 61 of a source of a reference potential, and a plate 62 connected through a plate resistor 63 to the positive terminal 55. An output is obtained from the plate 62.

Figure 2:
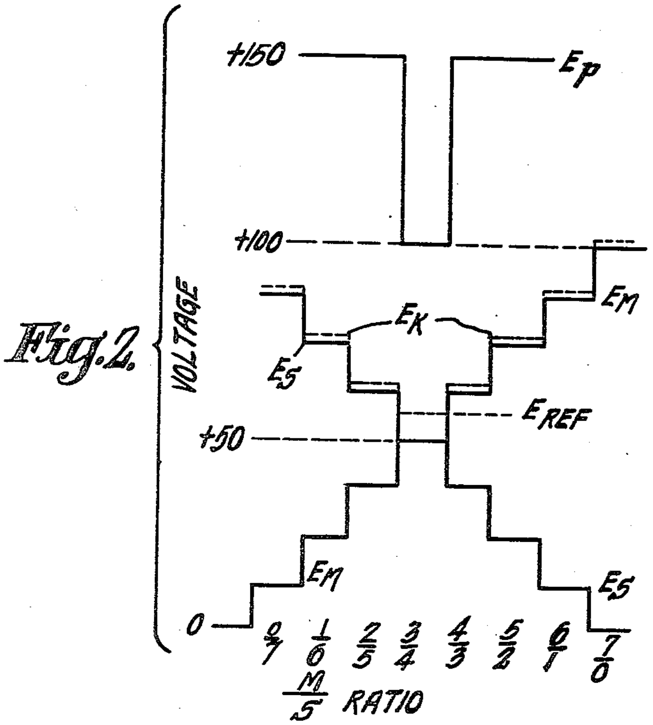
Figure 2 is a chart of voltages appearing in the circuit of Figure 1 and will be used in explaining the operation of the circuit.

The operation of the circuit of Figure 1 will now be described with references also to Figures 2 and 3. Each of the seven units of a received seven-unit character signal acts to throw the corresponding switches 11 through 17 to one position or the other, as for example, through the medium of electromechanical relays. If all of the switches are thrown to the mark position to provide a character signal of seven marks and zero spaces, the mark bus 28 is connected through eight resistors 21 through 27 and 30 to the positive potential on terminal 20 which may, for example, be 100 volts. The space bus 29 is then connected through eight resistors 31 through 37 and 40 to ground. The mark bus 28 thus assumes a potential of 100 volts and the space bus 29 assumes a potential of zero volts. This condition is shown in the chart of Fig. 2 for a mark/space ratio of 7/0, the potential of the mark bus 28 being shown as $E_M$, and the potential of the space bus 29 being shown as $E_S$. When all of the switches 11 through 17 are thrown to the space position indicating a character signal of seven spaces, the mark bus 28 is connected through seven resistors 21 through 27 to ground potential and through one resistor 30 to 100 volts. The potential on the mark bus 28 is thus one eighth of 100 volts. The space bus 29 under this condition is connected through seven resistors 31 through 37 to +100 volts on the seven space terminals S, through balancing resistor 40 to ground. Therefore, by voltage divider action space bus 29 assumes a potential of seven-eighths of 100 volts. This condition is shown in the chart of Fig. 2 for a mark/space ratio of 0/7. The chart of Fig. 2 also shows the potential $E_M$ on the mark bus 28 and the potential $E_S$ on the space bus 29 for each of the eight possible mark space ratios. The potential $E_M$ on mark bus 28 is applied to the grid 45 of duo-triode 46, and the potential $E_S$ on space bus 29 is applied to the grid 50 of tube 46. When the mark/space ratio is high, the potential $E_M$ applied to grid 45 is high and the potential $E_S$ applied to grid 50 is low. Therefore, most or all of the current flowing through the cathode resistor 56 under high mark/space ratio is due to current flowing from plate 48 to cathode 47. On the other hand, when the mark/space ratio is low, a relatively higher potential is applied to grid 50 than is applied to grid 45 and most or all of the current through cathode resistor 56 is due to current flowing from plate 52 to cathode 51. Preferably the tubes and biases are selected so that when the mark/space ratio is 4/3 or higher, all the current flow is through tubes structure 47, 45, 48; and when the mark/space ratio is 2/5 or less, all the current flow is through tube structure 51, 50, 52. The "and/or" circuit comprises two cathode followers with a common cathode resistor 56. The potential on the cathode of a cathode follower follows the potential on the grid. Since the cathodes 47, 51 are tied together, they assume a potential determined by the more positive one of the potentials applied to grids 45, 50. The potential on the cathodes is shown as dotted line $E_K$ on the chart of Fig. 2 for various mark/space ratios. The current flowing through cathode resistor 56 is a minimum when the potentials supplied to grids 45 and 50 are equal. The potentials applied to grids 45 and 50 are equal when any three of switches 11 through 17 are in the mark position and the other four switches are in the space position. It may be noted that if balancing resistors 30 and 40 were deleted from the circuit, the circuit would not be able to distinguish between character signals having mark/space ratios of 3/4 and 4/3.

The potential $E_K$ at the cathodes 47, 51 with various mark/space ratios is shown in Fig. 2. The potential $E_K$ is a minimum when the current flow through cathode resistor 56 is the sum of equal currents through the two tube structures in tube 46. The potential $E_K$ is directly applied to the cathode 58 of gate generator tube 59. The grid 60 of tube 59 is biased by a source of potential $E_{REF}$ which is selected to have a value such that tube 59 will conduct only when the minimum potential $E_K$ is coupled to cathode 58. During the period that tube 59 conducts, a negative output gate is generated on the plate 62 of the tube. If the B+ potential applied to plate electrode 62 is 150 volts, the potential on the plate 62 of tube 59 drops to about 100 volts when the tube conducts and the output potential on the plate 62 remains at about 100 volts so long as the potentials on the mark bus 28 and space bus 29 are equal in value.

It will be understood that one seven-unit character signal is applied to the validity checker at a time. A seven-unit character signal is applied to the validity checker and if the signal has the proper mark/space ratio, equal potentials will appear on mark bus 28 and space bus 29 with the result that tube 59 conducts and provides an output potential indicative of a valid seven-unit input signal. The output potential is used in connection with other circuits to allow the valid seven-unit character signal to pass on to utilization circuits. A following seven-unit character signal is then applied to the validity checker circuit for analysis. If the signal has other than the desired mark/space ratio, tube 59 does not conduct and the output potential from the plate 62 remains at the B+ value and is used in connection with other circuits to reject the non-valid signal. The validity checker of this invention may be used in a system such as that shown and described in my copending application Ser. No. 361,979, filed June 16, 1953, on a Code Conversion System.

Figure 3:
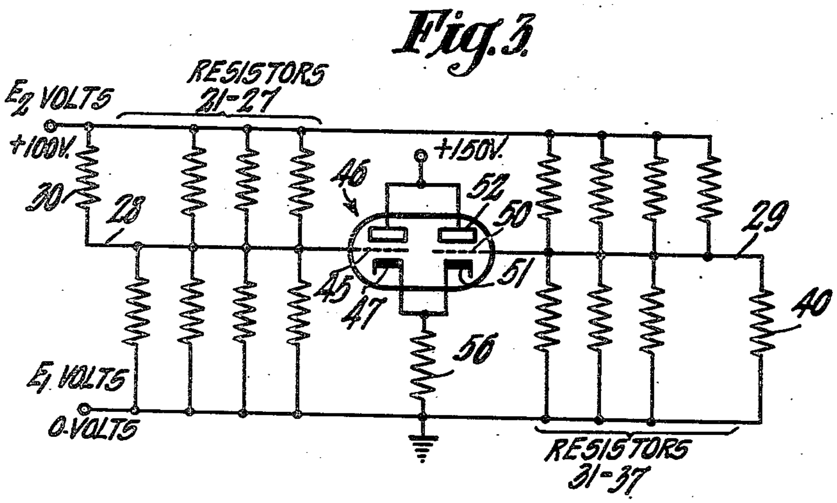
Figure 3 is a simplified representation of the circuit of Figure 1 as it in effect is when the seven-unit signal applied to the circuit consists of three mark units and four space units.

Fig. 3 shows the circuit of Fig. 1 rearranged to more clearly indicate how the circuit operates. Fig. 3 shows the potentials to which various resistors are connected when switches 11 through 17 are thrown to positions representative of a character signal having the desired mark/space ratio of 3/4. Under this condition, three of the resistors 21 through 27 are connected from the mark bus 28 to 100 volts, and four of the resistors are connected from the mark bus 28 to ground. Also, four of the resistors 31 through 37 are connected from the space bus 29 to 100 volts and three of the resistors are connected from the space bus 29 to ground. Balancing resistor 30 is permanently connected from the mark bus 28 to 100 volts, and balancing resistor 40 is permanently connected from the space bus 29 to ground. Since all the resistors are equal in value, it is apparent that when the character signal has three mark units and four space units, the potentials on the grids 45 and 50 are equal to each other and are equal to fifty volts by the voltage divider action of the resistors. When the input character signal has other than three mark units and four space units, the resistors 21 through 27 and 31 through 37 will be connected differently so that the potentials on the grids 45 and 50 will not be equal. Under this condition, the current flowing through resistor 56 is larger than it is when the grids 45 and 50 are of equal potential, and the potential on the cathodes 47, 51 is sufficiently high so that when it is applied to the cathode 58 of the tube 59 it maintains tube 59 in a cut-off condition.

The invention has been shown and described as including balancing resistors 30 and 40 which have values equal to each other and equal to resistors 21 through 27 and 31 through 37, and wherein balancing resistors 30 and 40 are connected to the same potentials of 100 volts and ground as the other resistors are connected. It will be understood by those skilled in the art that balancing resistors 30 and 40 may be of values different from the other resistors and may be returned to potentials different from those to which the other resistors are returned. The values of the balancing resistors 30 and 40 and the potentials to which they are returned must be selected so that when a valid seven-unit character signal is applied to the circuit, equal currents will flow in all sixteen resistors. If the currents flowing in all sixteen resistors are equal, the potentials on the mark bus 28 and the space bus 29 will be equal and the circuit will operate in the desired manner.

It will be understood that the invention is applicable to character signals having other than seven-units and wherein a valid signal has a mark/space ratio other than 3/4. If, for example, a valid signal consists of two mark units and five space units, each of the balancing resistors must have a value equal to one third of the other resistors to insure equal currents in each of the other resistors. Of course, each balancing resistor could be in the form of three parallel resistors each equal in value to each of the other resistors. If the desired mark/space ratio is 1/1, balancing resistors are not required; or stated another way, the balancing resistors may have a value of infinity.

While the invention has been shown and described in connection with a circuit having a first potential of zero volts and a second potential of 100 volts, it will be understood that any two voltages may be used which have a sufficient differential to provide for reliable operation of the circuit.

According to this invention, a signal analyzing circuit is provided which is capable of recognizing any valid character signal of *n* units and having a predetermined ratio of mark and space units. The terms "mark" and "space" as describing the units of a character signal is intended to denote that the units are of two different types having some distinguishing characteristic and is not intended to limit the invention to mark and space signals as used in the telegraph art.

What is claimed is:

1. A signal analyzing circuit comprising means for applying plurality of simultaneous mark and space signals on an equal plurality of lines each including a mark and a space terminal, a mark being indicated on a line by a predetermined potential on the mark terminal and a reference potential on the space terminal, and a space being indicated on a line by said predetermined potential on the space terminal and said reference potential on the mark terminal, a mark bus and a space bus, equal value resistors individually connecting said mark terminals to said mark bus and connecting said space terminals to said space bus, a first source of a predetermined potential and a mark balancing resistor connecting said source to said mark bus, a second source of potential and a space balancing resistor connecting said second source to said space bus, said potential sources and balancing resistors having values which cause equal currents to flow through said equal value resistors solely when a predetermined ratio of mark and space signals is applied to said lines, and a potential comparison circuit coupled to said buses.

2. A signal analyzing circuit as defined in claim 1 wherein said potential comparison circuit comprises an "and/or" cathode coupled circuit having grids coupled, respectively, to said buses.

3. A signal analyzing circuit as defined in claim 2, and in addition an output vacuum tube circuit coupled to said "and/or" circuit.

4. A validity checker circuit comprising a source of simultaneous signal having $n$ pairs of mark and space terminals, each pair having a first potential on the mark terminal and a second potential on the space terminal to indicate a mark or having said first potential on the space terminal and said second potential on the mark terminal to indicate a space, a mark bus connected through individual impedances to said mark terminals, a source of said first potential connected through an impedance to said mark bus and a source of said second potential connected through an impedance to said space bus, a vacuum tube circuit having input terminals coupled to said mark and space buses, said impedances and potential sources having values which maintain said buses at substantially the same potential when a predetermined ratio of mark and space terminals are energized, said vacuum tube circuit being inoperative to generate a non-valid signal whenever the buses assume different potentials.

5. A validity checker circuit comprising a source of a simultanous signal of $n$ units, said source having $n$ mark terminals and $n$ space terminals grouped in $n$ pairs, each pair having a first potential on the mark terminal and a second potential on the space terminal to indicate a mark on said first potential on the space terminal and said second potential on the mark terminal to indicate a space, a first source of said first potential, a mark bus connected through $n+1$ impedances to said $n$ mark terminals and to said first source, a second source of said second potential, a space bus connected through $n+1$ impedances to said $n$ space terminals and said second source, and means to detect an unbalance in the potentials on said buses.

6. A validity checker circuit comprising a source of a simultaneous signal of $n$-units, said source having $n$ mark terminals and $n$ space terminals grouped in $n$ pairs, each pair having a first potential on the mark terminal and a second potential on the space terminal to indicate a mark or said first potential on the space terminal and said second potential on the mark terminal to indicate a space, a mark bus connected through individual impedances to said $n$ mark terminals, a space bus connected through $n$ individual impedances to said space terminals, a first source of potential connected through an impedance to said mark bus and a second source of potential connected through an impedance to said space bus, said impedances and sources of potential being chosen to provide a predetermined relationship between the potentials on said buses when there is a predetermined ratio between the $n$ mark and space signals from said signal source, and means to detect a departure from said predetermined relationship between the potentials on said buses.

7. A signal analyzing circuit comprising, means for applying a plurality of simultaneous mark and space signals on an equal plurality of lines each including a mark and a space terminal, a mark being indicated on a line by a predetermined potential on the mark terminal and a reference potential on the space terminal, and a space being indicated on a line by said predetermined potential on the space terminal and said reference potential on the mark terminal, a mark bus and a space bus, equal value resistors individually connecting said mark terminals to said mark bus and connecting said space terminals to said space bus, a mark balancing resistor connected at one end to said mark bus, a space balancing resistor connected at one end to said space bus, means to apply a predetermined potential between the other end of said resistors, said potential and said balancing resistors having values which cause equal currents to flow through said equal value resistors solely when a predetermined ratio of mark and space signals is applied to said lines, and a potential comparison circuit coupled to said buses.

References Cited in the file of this patent

UNITED STATES PATENTS

| Number | Name | Date |
|---|---|---|
| 2,512,038 | Potts | June 20, 1950 |
| 2,622,148 | Van Duren | Dec. 16, 1953 |
| 2,675,538 | McGuigan | Apr. 13, 1954 |
| 2,675,539 | McGuigan | Apr. 13, 1954 |